March 27, 1951 R. T. DICK 2,546,433
PARKING METER SYSTEM
Filed June 30, 1947 2 Sheets-Sheet 1

Inventor
Robert T. Dick
By Clarence A. O'Brien
and Harvey B. Jackson
Attorneys

March 27, 1951 R. T. DICK 2,546,433
PARKING METER SYSTEM

Filed June 30, 1947 2 Sheets-Sheet 2

Inventor

Robert T. Dick

By Clarence A. O'Brien
and Harvey B. Jacobson
Attorneys

Patented Mar. 27, 1951

2,546,433

UNITED STATES PATENT OFFICE 2,546,433

PARKING METER SYSTEM

Robert T. Dick, Houston, Tex., assignor, by direct and mesne assignments, of two-thirds to Fisher C. Burum, Houston, Tex., and one-third to George B. Lindler, Harris County, Tex.

Application June 30, 1947, Serial No. 758,048

2 Claims. (Cl. 161—15)

This invention relates to parking meters, such as used on streets for indicating and limiting the parking time of an automobile and it is particularly applicable to parking meters of the type operated by coins or tokens. For purposes of revenue and also in order to relieve the congestion on streets due to parked vehicles, it is desirable that the payment which starts the operation of the meter should only provide an indication of the parking time for a single vehicle while the unused periods between the departure of a vehicle and the expiration of the parking period allotted by the meter upon insertion of a coin or token should not be appropriated by any other vehicle arriving during such periods.

A connection between the vehicle and the meter is necessary for this purpose and this connection has as a rule been provided by electric circuits operated by the weight of the vehicle, by conducting rails displaced by the vehicle by switches mounted in the curbstone or the like. However most of these arrangements are rather complex and need some servicing. They also, as a rule, need an electric installation which has to be weatherproof.

It is the object of the present invention to provide a purely mechanical connection which is simple, efficient and weatherproof, which is operated by the wheels of the vehicle without being in any way conspicuous on the street or an obstacle to normal street traffic and which sets the parking meter back to its starting position as soon as the vehicle leaves the parking space in front of or near the meter.

The invention for this purpose provides an elastic fluid filled member embedded within a base arranged below street level in such a way that the elastic member does not or only to a very small extent projects above the street level. This member is connected with a fluid pipe leading directly to the parking meter and into it and at the end of this pipe which may be close to the actuating mechanism of the parking meter the fluid movement may be translated by means of a fluid operated movable member, such as a piston valve into the mechanical movement of a rod or wire operating or influencing the mechanism of the parking meter in the manner indicated.

This mechanism is therefore of the greatest simplicity, does not in any way obstruct or change the street surface, is inconspicuous so as not to attract attention and as far as exposed consists merely of a fluid filled member and a pipe which are intrinsically weatherproof elements.

A further feature of the invention resides in the simple way in which the fluid operated movable member releases or returns the indicating member, for instance a disk or flag indicator, which is held in position, indicating payment for a certain parking period, as soon as the vehicle is moved away from the parking meter, thereby causing a surge of the fluid in the pipe leading from the elastic member.

The invention will be more readily understood and further objects of the invention will be rendered apparent when referring to the following detailed specification describing the invention with reference to the accompanying drawings.

Said drawings illustrate an embodiment of the invention by way of example, but it is to be understood that the embodiment shown serves mainly the purpose of explaining the constructive principles and does not attempt to furnish a summary of the various possible modifications. Modifications of the embodiment shown do not therefore necessarily involve a departure from the invention.

Figure 1:
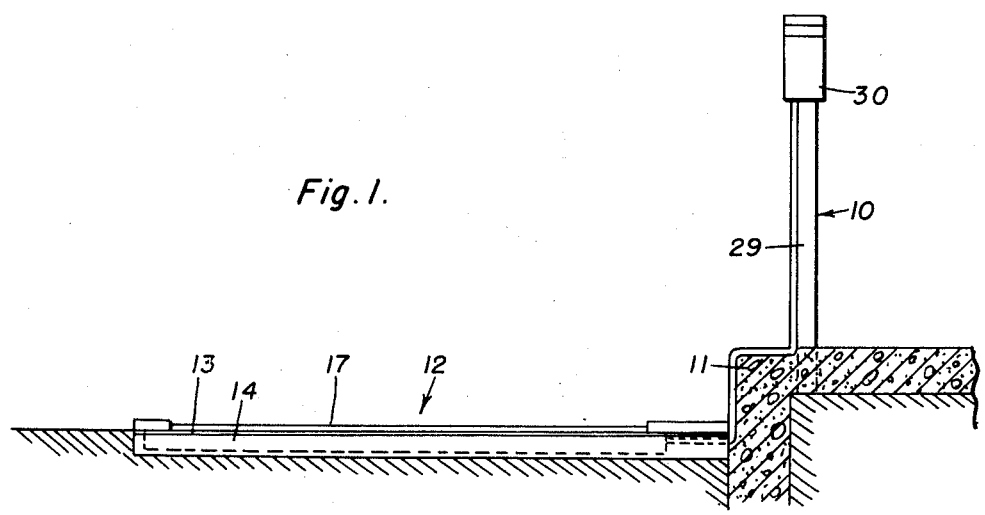
Figure 1 is an elevational view of the parking meter and of the structure in front or near it.
Figure 2:
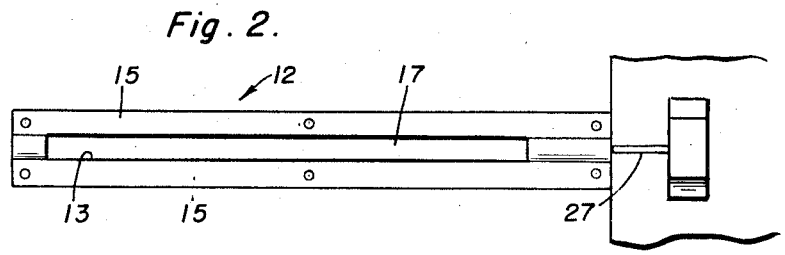
Figure 2 is a top view of the arrangement shown in Figure 1.
Figure 3:
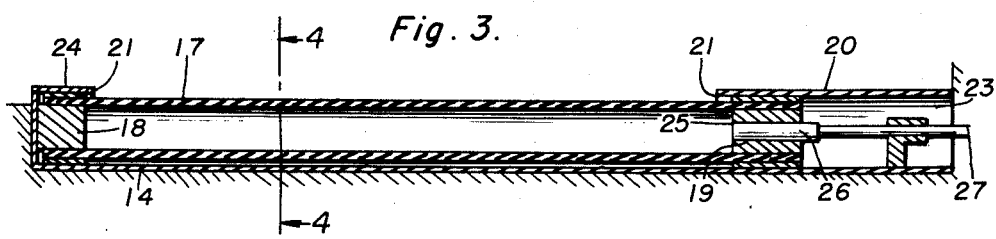
Figure 3 is a sectional elevational view on an enlarged scale of the structure on and below street level.

The parking meter arrangement consists of the meter 10 proper which is mounted near the curbstone 11 and which is connected with the structure actuated by the vehicle generally indicated at 12, which is arranged at and below the street surface on the parking lot or street section supervised by the meter. Preferably this structure is arranged at right angle to the curbstone and extends outwardly and transversely through the area which is occupied by the vehicle. The vehicle, when occupying the parking space or lot, has therefore some of its wheels placed behind this structure and when leaving the parking space the wheels have to overrun said structure.

The structure 12 consists of a base or frame structure 14 having the shape of a partially closed cylindrical casing or box which is provided at its open upper end with flanges 15. These flanges run along the open end, which forms a kind of slot 13. They are preferably arranged in a plane which is coincident with the surface 16 of the street.

Figure 4:
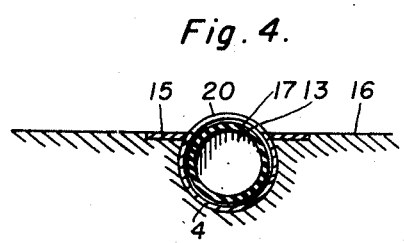
Figure 4 is a vertical cross sectional view through this structure along line 4—4 of Figure 3 on an enlarged scale.
Figure 5:
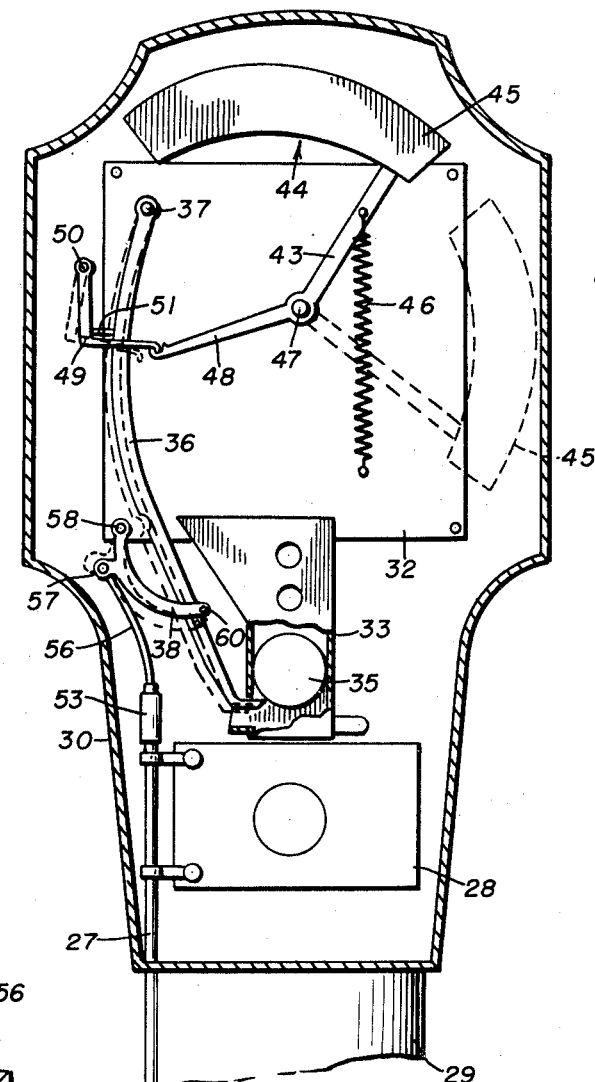
Figure 5 is a partly sectional elevational view of the parking meter head.
Figure 6:
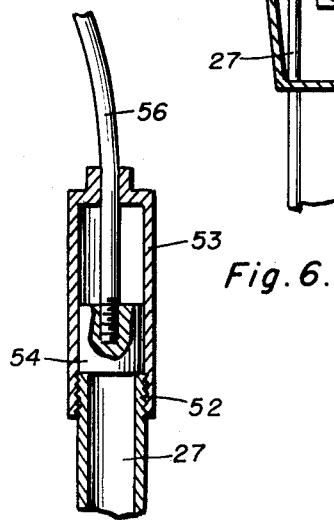
Figure 6 is a sectional elevational view of the piston valve head.

Within the cylindrical base member 14 a cylindrical elastic hose member 17 is arranged which at the open end of the base member projects slightly beyond the surface of the street. The extent to which said hose member projects above street level is merely a fraction of an inch and in Figure 4 the extent to which the hose projects above the street level is exaggerated. The elastic hose projects practically only very slightly along a substantially linear strip. When it is found undesirable that the hose member should project above the street surface, the flanges 15 may be slightly inclined towards each other.

At its outer end the elastic hose member 17 is closed by means of a stopper 18. This end is preferably surrounded by the closed end of the base member 14 which is either provided with an integral cap structure 24 or which is closed by a structure attached to the flanges at this end.

The inner end of the base member 14 near the curbstone 11 is provided with a sleeve 20 which encircles the elastic hose member 17 completely, but which has an open end 23.

The hose member 17 may be held within this sleeve and within the cap 24 at the other end by means of strips or bands 21 made of an elastic material.

The elastic hose member 17 is closed at its inner end by means of a stopper 19 which is provided with a central opening 25 into which the end portion 26 of a pipe 27 is inserted.

Pipe 27 leads directly to the parking meter 10 either along or through the curbstone 11 as shown in Figure 1. Preferably the pipe is disposed in channels or grooves and does not project. It then leads along or within the standard 29 supporting the parking meter to the head 30 of said meter which encloses the clock and indicating arrangement.

The mechanism of the parking meter need not be described or shown as it is well known and is not part of this invention. Merely the casing of the clock mechanism 32 and the coin chute 33 is shown in which the coin 35 is held by means of a meter resetting lever 36 pivoted at 37 and operated by the clock mechanism on one hand and by the trigger 38 to be described later on the other hand. Below the coin chute 33 the collection box 28 is arranged into which the coin drops when released.

The indicator 40 consisting of a colored segment, flag or strip 43 mounted on a lever 45 is pivoted at 47 and is under the influence of a spring 46. Its position of rest is indicated in dotted lines and from this position the indicator is moved to the position shown in full lines upon insertion of a coin and the starting of the clock mechanism. When moved to this position it is held by means of the elongated pawl 48 and the latch 49 engaging the end of the pawl. The latch 49 is pivoted at 50 and is moved and disengaged by the movement of resetting lever 36 which presses on a pin or projection 51 of the latch thus moving it to the left into the position indicated in dotted lines when the lever 36 is moved to the left.

The above described mechanism is part of a well known parking meter mechanism and is not part of this invention which is merely connected with the way of moving the meter resetting lever 36 by means of the trigger 38.

This movement is produced by means of the movement of the non-elastic fluid pressure in the pipe 27. The said pipe ends at a suitably selected point and is screw threaded at this end (at 52), and in this end the casing 53 of a piston valve 54 is fixed. Within this casing 53 forming a cylinder the piston valve 54 is movable. It is attached to wire 56 which in its turn is fixed to an ear 57 projecting from releasing trigger 38 at a suitable point near its pivot 58. The trigger 38 is pivoted to the housing 32 and is preferably curved and projects over the lever 36. At its end it is provided with a pin or latch hook 60 which engages the meter resetting lever 36 and carries it with it when the trigger is moved clockwise. Such a movement may be imparted to it by wire 56 pushed upwardly by piston valve 54.

The operation of the parking meter will be readily understood from the foregoing description.

When a coin or token is inserted the indicator 44 is moved from the position shown in dotted line to the position shown in full lines and the clock mechanism is started. This position indicates that, at the time, the vehicle in front of the meter is within the regulation parking time limits allowed to such vehicle. When this time expires the well known mechanism (not connected with this invention) by means of the clock mechanism 32 moves lever 36, whereupon the prong of the lever is withdrawn from the chute, the coin drops into the collecting box and the latch 49 is moved backward.

Assuming now that the parked car leaves before the parking time has expired, then the wheels of the car will have to pass over the base member 14 and the upper portion of hose 17 protruding from it. This passage causes a compression of the volume of the fluid within the hose and a displacement of the fluid in the pipe 27. The piston valve 54 is therefore moved upwardly under this pressure and the wire 56 thereby moves trigger 38 and the latter by means of latch hook or pin 60 moves lever 36 into its dotted position. In this position the protruding tongue of lever 36 leaves the chute so that the coin drops into the box, thus putting the apparatus at rest while latch 49 is pushed backward by means of pin 57 and does no longer hold pawl 48. The spring 46 therefore returns the indicator 44 into its position of rest indicated in dotted lines.

It is thus seen that the parking meter returns into its position of rest whenever the vehicle leaves the stand or parking space after the insertion of a coin.

Obviously the field of application is not limited to parking meters on streets, and it will also be understood that constructive changes may be made without affecting the essence of the invention.

Having described the invention, what is claimed as new is:

1. A parking meter system including a parking meter with a head enclosing a clockwork mechanism, and a clockwork operated meter release and resetting lever, comprising an elongated cylindrical box arranged transversely with respect to the parking space at and below street level, having a slotted upper portion, running along the cylindrical box in parallelism to the axis of the said cylindrical box, flanges on said box on both sides of the slotted portion, said flanges being parallel to the axis of the cylindrical box and arranged substantially at ground level, an elongated elastic cylindrical hose fitting into the cylindrical box and closed at its outer and inner end, said hose being filled with a non-elastic fluid, the uppermost portion of said hose projecting between and slightly above the aforesaid flanges and being exposed along a substantially linear strip through the said slot between said flanges, a fluid pipe in communication with the fluid filled interior of the elastic hose, leading into the parking meter head, a piston at the end of said pipe, a release member for operating the meter resetting lever mechanically and independently from the clockwork mechanism and a mechanical motion transmitting connection between said release member and said piston.

2. A parking meter system including a parking meter with a head enclosing a clockwork mechanism, a clockwork operated meter resetting lever, comprising a substantially cylindrical box arranged transversely with respect to the parking space at and below street level, having a slotted upper portion, running along the cylindrical box in parallelism to the axis of the said cylindrical box, flanges enclosing the slotted portion of the box, arranged substantially in parallelism to the slot on both sides of the same at ground level, a cylindrical hose of elastic material closed at its outer and inner end, and fitted into the said cylindrical box, said hose being filled with a non-compressible fluid, the uppermost portion of said cylindrical hose projecting between the flanges of the cylindrical box with a substantially linear strip exposed through the said slot between said flanges, a fluid pipe inserted into the closed end of the cylindrical hose, leading into the interior of the said cylindrical hose of elastic material and into the parking meter head, a piston at the end of said pipe, a releasing trigger pivoted to said head and in operative relation with respect to the meter resetting lever, adapted to engage said lever and to operate it independently of the clockwork, when moved in one direction, and a wire attached to said piston and to said releasing trigger for moving the latter upon displacement of the fluid within the pipe and of the piston at its end.

ROBERT T. DICK.

REFERENCES CITED

The following references are of record in the file of this patent:

UNITED STATES PATENTS

| Number | Name | Date |
| --- | --- | --- |
| 2,096,155 | Breeden | Oct. 19, 1937 |
| 2,264,479 | Munson | Dec. 2, 1941 |